(12) United States Patent
Kobayashi et al.

(10) Patent No.: US 12,308,048 B1
(45) Date of Patent: May 20, 2025

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventors: Ryo Kobayashi, Tokyo (JP); Akio Mizuno, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/600,876

(22) Filed: Mar. 11, 2024

(30) Foreign Application Priority Data

Nov. 16, 2023 (JP) .................................. 2023-195216

(51) Int. Cl.
| | |
|---|---|
| *G11B 5/00* | (2006.01) |
| *G11B 5/02* | (2006.01) |
| *G11B 5/55* | (2006.01) |
| *G11B 20/10* | (2006.01) |
| *G11B 20/18* | (2006.01) |

(52) U.S. Cl.
CPC .......... *G11B 20/10009* (2013.01); *G11B 5/02* (2013.01)

(58) Field of Classification Search
CPC ..... G11B 5/54; G11B 5/59627; G11B 5/5534; G11B 5/5539; G11B 5/5547; G11B 15/005; G11B 27/36; G11B 20/18; G11B 5/00; G11B 20/10009
USPC ......................................... 360/78.07, 58, 53
See application file for complete search history.

(56) References Cited

U.S. PATENT DOCUMENTS

| | | | |
|---|---|---|---|
| 8,793,431 B2 * | 7/2014 | Bandic | G11B 20/1879 711/E12.019 |
| 10,650,845 B2 | 5/2020 | Ikeshima | |
| 10,761,777 B2 | 9/2020 | Malina et al. | |
| 11,188,252 B2 | 11/2021 | Shen et al. | |
| 2019/0065121 A1 | 2/2019 | Malina et al. | |
| 2020/0090684 A1 | 3/2020 | Ikeshima | |
| 2021/0286552 A1 | 9/2021 | Shen et al. | |

* cited by examiner

*Primary Examiner* — Nabil Z Hindi
(74) *Attorney, Agent, or Firm* — Kim & Stewart LLP

(57) ABSTRACT

According to one embodiment, a magnetic disk device includes a disk, a head, a volatile buffer memory, a non-volatile memory, a main power supply, and a control unit. The control unit includes a write processing unit, a management unit, a data protection processing unit, a counter, and a determination unit. When the determination unit determines that a difference has reached a threshold, the management unit returns write data of the volatile buffer memory, which is original data of write data of a track in which a count value becomes a maximum value among tracks, to a protection target.

14 Claims, 12 Drawing Sheets

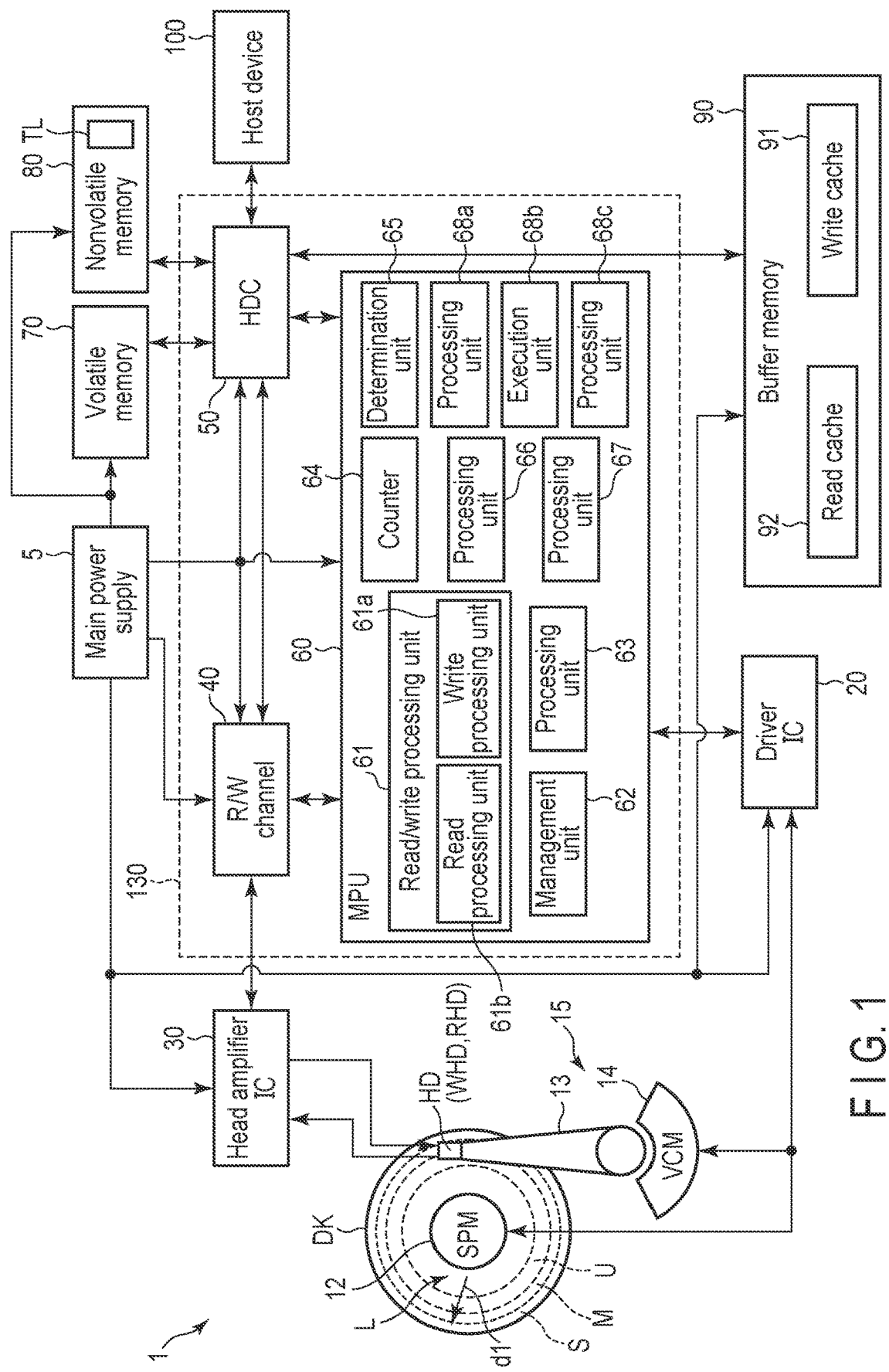
F I G. 1

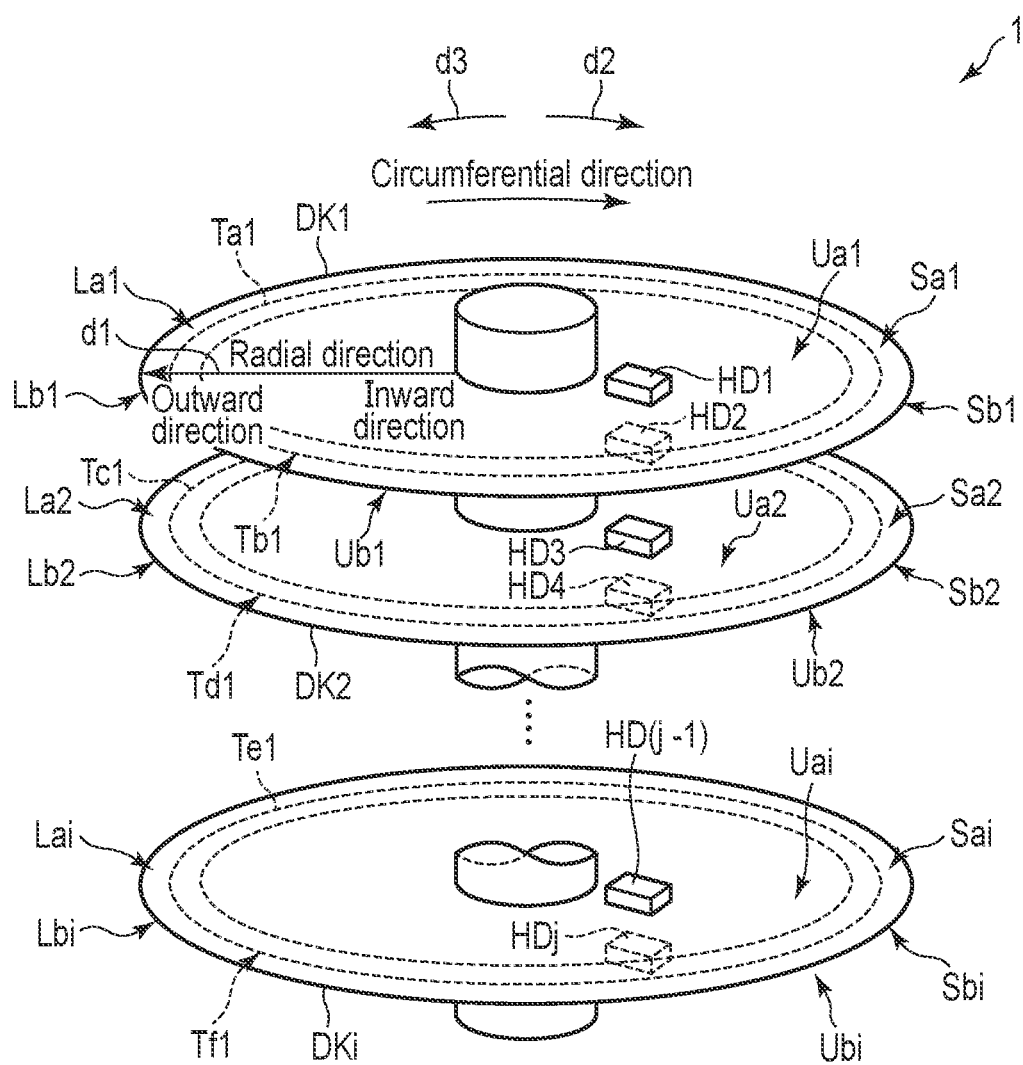
F I G. 2

| Head | Region | Track | Use state | Count value | Difference | Threshold |
|---|---|---|---|---|---|---|
| HD1 | M0 | CTR0 | (Free) | 0(Minimum value) | 0 | 10 |
| | | CTR1 | (Free) | 0(Minimum value) | 0 | |
| | | CTR2 | (Free) | 0(Minimum value) | 0 | |
| | | CTR3 | (Free) | 0(Minimum value) | 0 | |
| | | CTR4 | Data present | 10(Maximum value) | 10 | |
| | | CTR5 | Data present | 3 | 3 | |
| | | CTR6 | Data present | 5 | 5 | |
| | | CTR7 | (Free) | 0(Minimum value) | 0 | |
| | M1 | CTR0 | Data present | 1(Minimum value) | 0 | 10 |
| | | CTR1 | Data present | 1(Minimum value) | 0 | |
| | | CTR2 | Data present | 1(Minimum value) | 0 | |
| | | CTR3 | Data present | 1(Minimum value) | 0 | |
| | | CTR4 | Data present | 10(Maximum value) | 9 | |
| | | CTR5 | Data present | 3 | 2 | |
| | | CTR6 | Data present | 5 | 4 | |
| | | CTR7 | Data present | 1(Minimum value) | 0 | |
| | M2 | CTR0 | (Free) | 0(Minimum value) | 0 | 10 |
| | | CTR1 | (Free) | 0(Minimum value) | 0 | |
| | | CTR2 | (Free) | 0(Minimum value) | 0 | |
| | | CTR3 | (Free) | 0(Minimum value) | 0 | |
| | | CTR4 | Data present | 1(Maximum value) | 1 | |
| | | CTR5 | (Free) | 0(Minimum value) | 0 | |
| | | CTR6 | (Free) | 0(Minimum value) | 0 | |
| | | CTR7 | (Free) | 0(Minimum value) | 0 | |
| | M3 | CTR0 | (Free) | 0(Minimum value) | 0 | 10 |
| | | CTR1 | (Free) | 0(Minimum value) | 0 | |
| | | CTR2 | (Free) | 0(Minimum value) | 0 | |
| | | CTR3 | (Free) | 0(Minimum value) | 0 | |
| | | CTR4 | (Free) | 0(Minimum value) | 0 | |
| | | CTR5 | (Free) | 0(Minimum value) | 0 | |
| | | CTR6 | (Free) | 0(Minimum value) | 0 | |
| | | CTR7 | (Free) | 0(Minimum value) | 0 | |

F I G. 10

| Head | Region | Track | Use state | Count value | Difference |
|---|---|---|---|---|---|
| HD1 | M0 | CTR0 | (Free) | 0(Minimum value) | 0 |
| | | CTR1 | (Free) | 0(Minimum value) | 0 |
| | | CTR2 | Data present | 11(Maximum value) | 11 |
| | | CTR3 | Data present | 0(Minimum value) | 0 |
| | | CTR4 | Data present | 11(Maximum value) | 11 |
| | | CTR5 | (Free) | 0(Minimum value) | 0 |
| | | CTR6 | (Free) | 0(Minimum value) | 0 |
| | | CTR7 | (Free) | 0(Minimum value) | 0 |

F I G. 11

| Head | Region | Track | Use state | Count value | Difference | Threshold |
|---|---|---|---|---|---|---|
| HD1 | M0 | CTR0 | (Free) | 0 | 0 | 10 |
| | | CTR1 | (Free) | 0 | 0 | |
| | | CTR2 | (Free) | 0 | 0 | |
| | | CTR3 | (Free) | 0 | 0 | |
| | | CTR4 | Data present | 0+1=1 | 1 | |
| | | CTR5 | Data present | 0 | 0 | |
| | | CTR6 | (Free) | 0 | 0 | |
| | | CTR7 | (Free) | 0 | 0 | |

F I G. 12

| Head | Region | Track | Use state | Count value | Difference | Threshold |
|---|---|---|---|---|---|---|
| HD1 | M0 | CTR0 | (Free) | 0 | 0 | 10 |
| | | CTR1 | (Free) | 0 | 0 | |
| | | CTR2 | (Free) | 0 | 0 | |
| | | CTR3 | Data present | 0 | 0 | |
| | | CTR4 | Data present | 9+1=10 | 10 | |
| | | CTR5 | Data present | 3 | 3 | |
| | | CTR6 | Data present | 5 | 5 | |
| | | CTR7 | (Free) | 0 | 0 | |

F I G. 13

| Head | Region | Track | Use state | Count value | Difference | Threshold |
|---|---|---|---|---|---|---|
| HD1 | M0 | CTR0 | (Free) | 0 | 0 | 10 |
| | | CTR1 | (Free) | 0 | 0 | |
| | | CTR2 | (Free) | 0 | 0 | |
| | | CTR3 | Data present | 0 | 0 | |
| | | CTR4 | (Free) | 0 | 0 | |
| | | CTR5 | Data present | 3 | 3 | |
| | | CTR6 | Data present | 5 | 5 | |
| | | CTR7 | (Free) | 0 | 0 | |

F I G. 14

| Head | Region | Track | Use state | Count value | Difference | Threshold |
|---|---|---|---|---|---|---|
| HD1 | M0 | CTR0 | (Free) | 0 | 0 | 10 |
| | | CTR1 | (Free) | 0 | 0 | |
| | | CTR2 | (Free) | 0 | 0 | |
| | | CTR3 | Data present | 0 | 0 | |
| | | CTR4 | (Free) | 0 | 0 | |
| | | CTR5 | Data present | 3 | 3 | |
| | | CTR6 | (Free) | 0 | 0 | |
| | | CTR7 | (Free) | 0 | 0 | |

F I G. 15

| Head | Region | Track | Use state | Count value | Difference | Threshold |
|---|---|---|---|---|---|---|
| HD1 | M0 | CTR0 | (Free) | 0 | 0 | 10 |
| | | CTR1 | (Free) | 0 | 0 | |
| | | CTR2 | Data present | 0 | 0 | |
| | | CTR3 | Data present | 1 | 0 | |
| | | CTR4 | (Free) | 0 | 0 | |
| | | CTR5 | Data present | 3 | 3 | |
| | | CTR6 | (Free) | 0 | 0 | |
| | | CTR7 | (Free) | 0 | 0 | |

F I G. 16

MAGNETIC DISK DEVICE

CROSS-REFERENCE TO RELATED APPLICATIONS

This application is based upon and claims the benefit of priority from Japanese Patent Application No. 2023-195216, filed Nov. 16, 2023, the entire contents of which are incorporated herein by reference.

FIELD

Embodiments described herein relate generally to a magnetic disk device.

BACKGROUND

As a magnetic disk device, there are known a conventional magnetic recording (CMR) (or a conventional recording) magnetic disk device that writes a plurality of tracks at intervals in a radial direction of a disk, a shingled Magnetic Recording (SMR, or Shingled Write Recording (SWR)) magnetic disk device that overwrites a plurality of tracks in the radial direction of a disk, and a hybrid recording magnetic disk device that selects and executes the conventional magnetic recording and the shingled magnetic recording.

The disk has a media cache region. The write data received by the magnetic disk device from a host device is temporarily written in the media cache region.

As an adverse effect on an adjacent track when data is written to a track of a disk, adjacent track interference (ATI) is known. It is difficult to read data of a track having a large adverse effect of ATI. Therefore, before it becomes difficult to read data, the refresh processing of reading data of a track, rewriting the data to the track, and recovering the data of the track is performed.

BRIEF DESCRIPTION OF THE DRAWINGS

FIG. 1 is a block diagram showing a configuration of a magnetic disk device according to an embodiment.

FIG. 2 is a perspective view showing a part of the magnetic disk device, and is a view showing a plurality of disks and a plurality of heads.

FIG. 6 is an enlarged plan view showing the disk shown in FIG. 3, and is a diagram showing four media cache regions, four user data regions, and the like.

FIG. 10 is a diagram showing a part of a management table shown in FIG. 1, and is a diagram showing a plurality of count values and the like of the media cache region of a first recording layer.

FIG. 11 is a diagram showing a plurality of count values and the like of a media cache region in the management table shown in FIG. 10, and is a diagram reflecting a result of writing write data continuously to a fourth track without determining whether the difference has reached a threshold.

FIG. 12 is a diagram showing a plurality of count values and the like of a media cache region in the management table shown in FIG. 10, and is a diagram reflecting a result of writing write data to the fourth track.

FIG. 13 is a diagram showing a state after a lapse of time from the state of the management table shown in FIG. 12, and is a diagram reflecting up to the result of writing write data to the fourth track.

FIG. 14 is a diagram reflecting that a fifth track is regarded as a free track after the time has elapsed from the state of the management table shown in FIG. 13 and the original data of the write data of the fifth track is returned to the protection target.

FIG. 15 is a diagram reflecting that time has elapsed from the state of the management table shown in FIG. 14 and a seventh track is regarded as a free track after the original data of the write data of the seventh track is written in the user data region.

FIG. 16 is a diagram showing an example different from that of FIG. 15, and is a diagram reflecting that a time has elapsed from the state of the management table shown in FIG. 14 and the seventh track is regarded as a free track after the merged write data generated using the original data of the write data of the seventh track is written to the third track by garbage collection.

DETAILED DESCRIPTION

Figure 3:
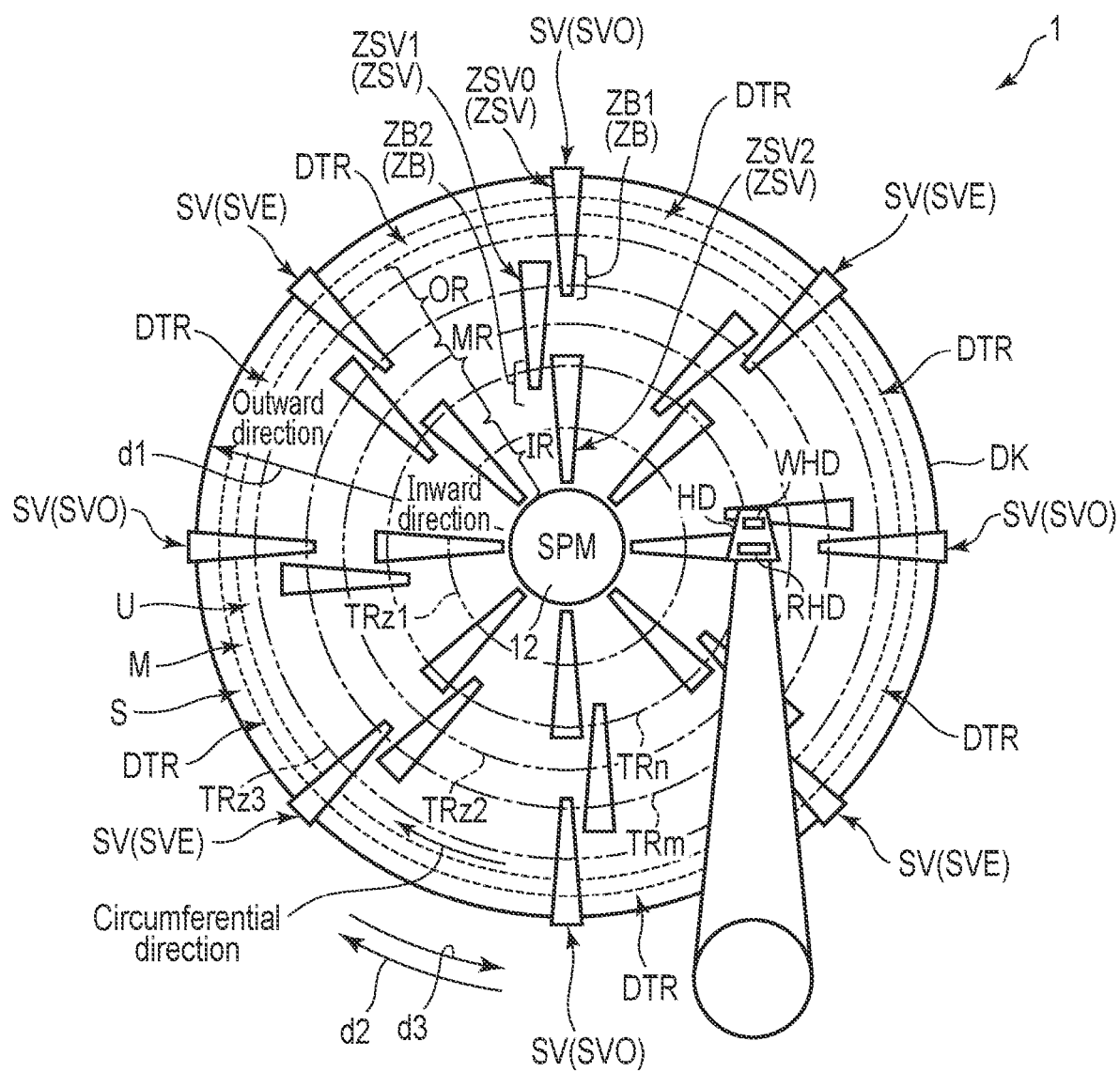
FIG. 3 is a schematic diagram showing an example of arrangement of a plurality of servo regions and a plurality of data regions of a disk according to the embodiment.

In general, according to one embodiment, there is provided a magnetic disk device comprising: a disk having a media cache region including a plurality of tracks continuous in a radial direction in a recording layer; a head that writes data to the recording layer of the disk and reads data from the recording layer; a volatile buffer memory in which write data including a write command and user data corresponding to the write command is written; a nonvolatile memory; a main power supply; and a control unit. The control unit includes a write processing unit that controls write processing of data to the recording layer, a management unit that includes, among the write data written in the volatile buffer memory, write data before being written in the media cache region as a protection target and removes the write data after being written in the media cache region from the protection target, a data protection processing unit that saves the write data managed as the protection target by the management unit to the nonvolatile memory when the main power supply is lost, a counter capable of individually counting up a count value of each of the tracks in the media cache region, the counter being capable of counting up the count value of a track adjacent to a track on which write data has been written each time the write data is written to the media cache region, and a determination unit that determines whether a difference between a maximum value and a minimum value among a plurality of count values of the tracks of the media cache region reaches a threshold. The management unit, when the determination unit determines that the difference has reached the threshold, returns the write data of the volatile buffer memory, which is original data of the write data of the track in which the count value becomes the maximum value among the tracks, to the protection target.

Embodiment

In the following, a magnetic disk device 1 according to an embodiment will be described with reference to the drawings. FIG. 1 is a block diagram showing the configuration of the magnetic disk device 1 according to the present embodiment. In the present embodiment, the magnetic disk device 1 is a hybrid recording magnetic disk device that selects and executes conventional magnetic recording and shingled magnetic recording. However, the technology described later may be applied to a magnetic disk device of conventional magnetic recording.

As shown in FIG. 1, the magnetic disk device 1 includes a plurality of disks (magnetic disks) DK as recording media, for example, one to ten disks DK, a main power supply 5, a spindle motor (SPM) 12 as a drive motor, a head stack assembly (in the following, referred to as an HDA) 15, a driver IC 20, a head amplifier integrated circuit (in the following, a head amplifier IC or a preamplifier) 30, a volatile memory 70, a nonvolatile memory 80, a buffer memory (buffer) 90, and a system controller 130 as a one-chip integrated circuit. The magnetic disk device 1 is connected to a host device (in the following, simply referred to as a host) 100.

Each disk DK is formed to have a diameter of 97 mm (3.8 inches), for example, and has recording layers (magnetic recording layers) L on its both surfaces. In the present embodiment, the magnetic disk device 1 includes 1 to 11 disks DK, but the number of disks DK is not limited to these numbers.

The HDA 15 includes the disk DK, a spindle motor (in the following, referred to as SPM) 12, an arm 13 on which a head HD is mounted, and a voice coil motor (in the following, referred to as VCM) 14. The disk DK is attached to the SPM 12 and rotates by the drive of the SPM 12. The arm 13 and the VCM 14 constitute an actuator. The actuator can control the movement of the head HD mounted on the arm 13 to a predetermined position of the disk DK by driving the VCM 14, i.e., the actuator can seek. In the present embodiment, the magnetic disk device 1 may include a plurality of disks DK and a plurality of heads HD.

In the disk DK, a user data region U that can be used by a user, a media cache region (or, sometimes referred to as a media cache) M that temporarily holds data (or a command) transferred from the host 100 or the like before writing the data in a predetermined region of the user data region U, and a system region S that writes information necessary for system management are allocated in a region in which the data can be written.

In the following, a direction from the inner circumference to the outer circumference of the disk DK is referred to as a radial direction d1. In the direction parallel to the radial direction d1, a direction from the inner circumference toward the outer circumference is referred to as an outward direction (outer side), and a direction from the outer circumference toward the inner circumference is referred to as an inward direction (inner side). A direction orthogonal to the radial direction d1 of the disk DK is referred to as a circumferential direction or a circumference direction. The circumferential direction corresponds to a direction along the circumference of the disk DK.

A predetermined position in the radial direction d1 of the disk DK is sometimes referred to as a radial position, and a predetermined position in the circumferential direction of the disk DK is sometimes referred to as a circumferential position. The radial position and the circumferential position are sometimes collectively referred to simply as a position. The radial position corresponds to a distance from the rotation center of the disk DK to a predetermined radial position, a distance from the innermost circumference of the disk DK to a predetermined radial position, a distance from a predetermined radial position of the disk DK to another radial position, or the like.

The head HD records and reads information on and from the disk DK. The head HD has a slider as a main body, and includes a write head WHD and a read head RHD mounted on the slider. The write head WHD writes data to the recording layer L of the disk DK. The read head RHD reads data from the data track of the recording layer L of the disk DK. In the following, "writing data" is sometimes referred to as "writing", "data write", "write processing", or the like. "Reading data" is sometimes referred to as "reading", "data read", "read processing", or the like.

Note that the write head WHD is sometimes simply referred to as a head HD, the read head RHD is sometimes simply referred to as a head HD, or the write head WHD and the read head RHD are sometimes collectively referred to as a head HD. The center (center of gravity) of the head HD is sometimes simply referred to as the head HD, the center (center of gravity) of the write head WHD is sometimes simply referred to as the write head WHD, and the center (center of gravity) of the read head RHD is sometimes simply referred to as the read head RHD.

The "center (center of gravity)" of the write head WHD is sometimes simply referred to as "the head HD", or the "center (center of gravity)" of the read head RHD is sometimes simply referred to as "the head HD". "Positioning the center of the head HD at the track center of a predetermined track" is sometimes expressed as "positioning the head HD on a predetermined track", "placing the head HD on a predetermined track", "locating the head HD on a predetermined track", or the like.

The system controller 130 includes a read/write (R/W) channel 40, a hard disk controller (HDC) 50, and a microprocessor (MPU) 60 as a control unit.

The driver IC 20 controls driving of the SPM 12 and the VCM 14 according to control of the system controller 130 (specifically, the MPU 60, described later). The SPM 12 supports and rotates the disks DK.

The head amplifier IC (preamplifier) 30 includes a read amplifier and a write driver. The read amplifier amplifies a read signal read from the disk DK and outputs the amplified read signal to the system controller 130 (specifically, the R/W channel 40). The write driver outputs a write current corresponding to a signal output from the R/W channel 40 to the write head WHD.

The volatile memory 70 is a semiconductor memory in which stored data is lost when power supply is cut off. The volatile memory 70 stores data and the like necessary for processing in each unit of the magnetic disk device 1. The volatile memory 70 is a random access memory (RAM). The volatile memory 70 is, for example, a dynamic random access memory (DRAM). However, the volatile memory 70 may be a synchronous dynamic random access memory (SDRAM).

The nonvolatile memory 80 is a semiconductor memory that records stored data even though power supply is cut off. The nonvolatile memory 80 is, for example, a NAND flash read only memory (FROM). However, the nonvolatile memory 80 may be a NOR-type FROM.

The buffer memory 90 is a semiconductor memory that temporarily stores data and the like transmitted and received between the magnetic disk device 1 and the host 100. Note that the buffer memory 90 may be configured integrally with the volatile memory 70. The buffer memory 90 is a volatile RAM. For example, the buffer memory 90 is a DRAM, a static random access memory (SRAM), an SDRAM, a ferroelectric random access memory (FeRAM), a magnetoresistive random access memory (MRAM), or the like.

The buffer memory 90 includes a region used as a write cache 91 and a region used as a read cache 92. Write data including a write command and user data corresponding to the write command is written to the write cache 91, and the write cache 91 temporarily stores the write data. The read command is written to the read cache 92, and the read cache 92 temporarily stores the read command.

The system controller (controller) 130 is realized by using, for example, a large-scale integrated circuit (LSI) referred to as a system-on-a-chip (SoC) in which a plurality of elements is integrated on a single chip. The system controller 130 is electrically connected to, for example, the driver IC 20, the head amplifier IC 30, the volatile memory 70, the nonvolatile memory 80, the buffer memory 90, and the host 100.

The R/W channel 40 executes the signal processing of read data transferred from the disk DK to the host 100 and write data transferred from the host 100, for example, modulation processing, demodulation processing, encoding processing, and decoding processing in response to an instruction from the MPU 60, described later. The R/W channel 40 has a circuit or a function of measuring signal quality of read data. The R/W channel 40 is electrically connected to the head amplifier IC 30, the HDC 50, the MPU 60, and the like.

The HDC 50 controls data transfer between the host 100 and the R/W channel 40 according to an instruction from the MPU 60. The HDC 50 is electrically connected to, for example, the R/W channel 40, the MPU 60, the volatile memory 70, the nonvolatile memory 80, the buffer memory 90, and the like.

The main power supply 5, which is a power supply of the magnetic disk device 1, is connected to the driver IC 20, the head amplifier IC 30, the R/W channel 40, the HDC 50, the MPU 60, the volatile memory 70, the nonvolatile memory 80, and the buffer memory 90. The driver IC 20, the head amplifier IC 30, the R/W channel 40, the HDC 50, the MPU 60, the volatile memory 70, the nonvolatile memory 80, and the buffer memory 90 are driven by power supplied from the main power supply 5. The SPM 12 and the VCM 14 are driven by power supplied from the main power supply 5 via the driver IC 20.

The MPU 60 is a main controller that controls the components of the magnetic disk device 1. The MPU 60 controls the VCM 14 via the driver IC 20 to execute servo control that positions the head HD. The MPU 60 controls the SPM 12 via the driver IC 20 to rotate the disk DK. The MPU 60 controls a write operation of data to the disk DK and selects a storage destination of the write data. The MPU 60 controls a read operation of data from the disk DK and controls the processing of the read data. The MPU 60 manages a region in which data is recorded. The MPU 60 is connected to each unit of the magnetic disk device 1. The MPU 60 is electrically connected to the driver IC 20, the R/W channel 40, the HDC 50, and the like.

The MPU 60 includes a read/write processing unit 61, a management unit 62, a data protection processing unit 63, a counter 64, a determination unit 65, a write data selection processing unit 66, a write data merge processing unit 67, a command selection processing unit 68a, a command execution unit 68b, a command response processing unit 68c, and the like. The MPU 60 executes the processing of these units, for example, the read/write processing unit 61, the management unit 62, the data protection processing unit 63, the counter 64, the determination unit 65, the write data selection processing unit 66, the write data merge processing unit 67, the command selection processing unit 68a, the command execution unit 68b, the command response processing unit 68c, and the like on firmware. The MPU 60 may include these units as a circuit.

The read/write processing unit 61 includes a write processing unit 61a and a read processing unit 61b. In accordance with a command from the host 100, the write processing unit 61a controls the write processing of data to the recording layer L, and the read processing unit 61b controls the read processing of data from the recording layer L. The write processing unit 61a can execute the write processing of writing data to the recording layer L of the disk DK. The read processing unit 61b can execute the read processing of reading data from the recording layer L. The read/write processing unit 61 controls the VCM 14 via the driver IC 20, positions the head HD at a target position (predetermined radial position) on the disk DK, and executes read processing or write processing.

Among the write data written in the buffer memory 90, the management unit 62 can include the write data before being written in a media cache region M in the protection target and exclude the write data after being written in the media cache region M from the protection target.

The data protection processing unit 63 can save the write data managed as the protection target by the management unit 62 to the nonvolatile memory 80 when the main power supply 5 is lost. The data protection processing unit 63 can perform the power loss protection (PLP) processing of guaranteeing the write data of the protection target in the buffer memory 90.

The counter 64 can individually count up the count value of each track of the media cache region M. The counter 64 can count up the count value of the track adjacent to the track on which the write data is written every time when the write data is written to the media cache region M. The counter 64 increments the count value by "1" every time when the counter 64 counts up. However, the counter 64 may increase the count value by "0.8" or by "1.5" every time when the counter 64 counts up, and the numerical value to be increased is not specifically limited.

The nonvolatile memory 80 includes a management table TL that individually stores the count value of each track of the media cache region M. However, the management table TL may be included in a storage medium or a storage region other than the nonvolatile memory 80.

The determination unit 65 can determine whether the difference between the maximum value and the minimum value among a plurality of count values of a plurality of tracks of the media cache region M has reached the threshold.

The write data selection processing unit 66 can perform the reordering processing of rearranging the write data written in the buffer memory 90.

Processing performed by the write data merge processing unit 67 will be described later.

The command selection processing unit 68a can perform the reordering processing of rearranging a plurality of write commands of the write data written in the buffer memory 90.

The command execution unit 68b can execute the write command selected by the command selection processing unit 68a.

Processing performed by the command response processing unit 68c will be described later.

Next, a processing procedure when the determination unit 65 determines that the difference has reached the threshold and an effect of the processing procedure will be described.

When the determination unit 65 determines that the difference has reached the threshold, the management unit 62 can perform processing as follows. That is, the management unit 62 can return the write data of the buffer memory 90, which is the original data of the write data of the track having the maximum count value among the tracks of the media cache region M, to the protection target. Specifically, the status of the original data in the buffer memory 90 can be returned to the protection target.

In other words, when the determination unit 65 determines that there is data of a track greatly affected by adjacent track interference (ATI) in the media cache region M, the data protection processing unit 63 can perform the PLP processing on the write data of the buffer memory 90, which is the original data, together with the management unit 62. By performing the PLP processing, the write data (original data) of the buffer memory 90 can be guaranteed, and the write data can be guaranteed without additional write processing to the media cache region M. Therefore, the data protection processing unit 63 can quickly guarantee the write data together with the management unit 62. As a result, it is possible to contribute to shortening the time necessary for the write processing to the media cache region M.

Furthermore, since it is not necessary to forcibly write the original data of the data of the track greatly affected by ATI to the user data region U, which is the registered address, it is possible to obtain an effect of increasing the efficiency of processing such as the write processing.

When the determination unit 65 determines that the difference has reached the threshold, the counter 64 and the write processing unit 61a can perform processing as follows. That is, the counter 64 resets the count value of the track having the maximum count value to the initial value. The write processing unit 61a can regard the track having the maximum count value as a free track that is overwritable.

The initial value is "0", for example. However, the initial value may be a numerical value other than "0".

As described above, since the write data (original data) of the buffer memory 90 is guaranteed by performing the PLP processing, the data of the track greatly affected by ATI in the media cache region M is indirectly guaranteed. For example, it is not necessary to provide a write guard on a track greatly affected by ATI and a track adjacent to the track (prohibit writing to a track greatly affected by ATI and a track adjacent to the track).

Since the write prohibited region in the media cache region M can be reduced, the volume of data that can be newly written from the buffer memory 90 to the media cache region M can be increased. Further, it is possible to increase candidates of writable tracks among the tracks in the media cache region M. In other words, since the degree of freedom of selecting the write destination of the media cache region M can be increased, the restriction of the reordering processing by the write data selection processing unit 66 can be relaxed. As a result, when the main power supply 5 is lost, the volume of write data that can be guaranteed by the media cache region M and the nonvolatile memory 80 can be increased.

Next, a processing procedure and an effect of the write processing unit 61a by the write data selection processing unit 66 performing the reordering processing will be described.

When the write data selection processing unit 66 performs the reordering processing, the write processing unit 61a can write the write data selected by the write data selection processing unit 66 in the media cache region M. Since the write data can be written to the media cache region M after the reordering processing is performed, the overhead can be shortened.

Note that, when the reordering processing is performed, the media cache region M is likely to be adversely affected by ATI as compared with the case in which the reordering processing is not performed (the case of sequential write). However, since the PLP processing can be performed as described above, it is possible to satisfactorily deal with the problem of the adverse effect of ATI.

Next, a timing at which the write data selection processing unit 66 performs the reordering processing and its effect will be described.

Whenever the write data transferred from the host 100 is newly written (stored) in the buffer memory 90, or the management unit 62 returns the write data excluded from the protection target to the protection target, the management unit 62 can update the protection target. That is, the management unit 62 can update the protection target at any time.

Whenever the management unit 62 updates the protection target, the write data selection processing unit 66 can perform reordering processing. Therefore, the write data selection processing unit 66 can always perform the reordering processing.

Next, the processing procedures of the write data merge processing unit 67 and the write processing unit 61a when the determination unit 65 determines that the difference has reached the threshold and an effect by the processing procedures will be described.

When the determination unit 65 determines that the difference has reached the threshold, the write data merge processing unit 67 can generate merged write data in which the head write data selected next by the write data selection processing unit 66 and the write data that is the original data are merged. In addition, the write processing unit 61a can write the merged write data including the head write data selected by the write data selection processing unit 66 in the media cache region M.

Therefore, the time necessary for the write processing to the media cache region M can be shortened as compared with the case in which the write data selection processing unit 66 individually writes the write data of the head selected next to the media cache region M and writes the write data, which is the original data, to the media cache region M without generating the merged write data.

By repeating the above processing procedure, the writable region of the media cache region M is less likely to be saturated, and the write data can be written to the optimum region of the media cache region M (region that can always be accessed at the highest speed). Therefore, it is possible to achieve both suppression of deterioration of write performance and guarantee of write data.

Next, a processing procedure of the command response processing unit 68c and an effect of the processing procedure will be described.

The magnetic disk device 1 has a write cache function of reporting status indicating that the execution of the write command has been completed at the time of receiving write data including the write command and user data from the host 100. When the write cache function is enabled (Write Cache Enable), the command response processing unit 68c can report status indicating that the execution of the write command is completed to the host 100 at the time when the write data is written to the buffer memory 90 (write cache 91).

On the other hand, when the write cache function is disabled (Write Cache Disable), the command response processing unit 68c can report the status indicating that the user data is written to the user data region U after the write data is written to the buffer memory 90 (the write cache 91), and the execution of the write command is completed to the host 100 at a point in time when the user data is guaranteed.

However, in the present embodiment, since the PLP processing is performed before the user data is written to the user data region U, which is the registered address, the write data is guaranteed at the time when the PLP processing is performed. Therefore, it is desirable to report the status indicating that the execution of the write command is completed to the host 100 without waiting for the writing of the user data to the user data region U.

That is, when the management unit 62 includes the write data as the protection target, it is desirable that the command response processing unit 68c report status indicating that the execution of the write command of the write data as the protection target is completed to the host 100. As a result, it is possible to advance the time to report the status to the host 100. The host 100 can recognize that the write to the medium of the magnetic disk device 1 is completed.

Next, a processing procedure of writing the user data in the user data region U and an effect by the processing procedure will be described.

The write data written in the buffer memory 90 (write cache 91) includes first write data including a first write command and first user data corresponding to the first write command.

After the first write data read from the buffer memory 90 is written to the media cache region M, the command execution unit 68b, the write processing unit 61a, and the management unit 62 can perform processing as follows.

That is, the command execution unit 68b executes the first write command selected by the command selection processing unit 68a.

The write processing unit 61a writes the first user data read from the buffer memory 90 in the user data region U, and subsequently, a region in which the first write data remains in the media cache region M is regarded as a free space that is overwritable.

The management unit 62 regards a region in which the first write data remains in the buffer memory 90 as a free space that is overwritable.

As described above, the free capacity of the media cache region M and the free capacity of the buffer memory 90 can be increased by writing the first user data in the user data region U, which is the registered address.

Next, a processing procedure of regarding the track of the media cache region M as a free track or resetting the count value, and an effect by the processing procedure will be described.

As described above, in the case in which the PLP processing is performed, the write processing unit 61a regards the track of the media cache region M as a free track. Further, the write processing unit 61a can regard the track of the media cache region M as a free track even in the case in which the user data is written in the user data region U which is the registered address.

For example, when the write processing unit 61a regards the entire region of the track in which the first write data remains in the media cache region M as a free space, the counter 64 can reset the count value of the track in which the first write data remains to an initial value.

Also in this example, when the main power supply 5 is lost, the volume of write data that can be guaranteed by the media cache region M and the nonvolatile memory 80 can be increased.

Next, a processing procedure in which the counter 64 counts up the count value and an effect by the processing procedure will be described.

Each of the tracks of the media cache region M is a free track on which write data is not written, a free track on which write data is written and overwriting is permitted, or a valid track on which write data is written and overwriting is prohibited.

The free track on which write data has not been written corresponds to an unused (initial) track on which write data has never been written.

The free track in which the write data is written and the overwriting is permitted corresponds to a track having only the write data corresponding to any one of (1) the write data guaranteed by the PLP processing and (2) the write data written in the user data region U.

The valid track in which the write data is written and overwriting is prohibited corresponds to a track having write data that has not yet been written in the user data region U.

The counter 64 includes the valid track in the target for counting up the count value and excludes the free track from the target for counting up the count value. In other words, the counter 64 includes the track in which the occurrence of the error due to the ATI at the time of reading is desired to be avoided as the target for counting up the count value. As a result, it is possible to accurately grasp the degree to which the tracks of the media cache region M are adversely affected by ATI, and to perform the PLP processing at a desired timing.

Here, depending on the position of the first track in which the write data is written in the media cache region M, there are a case of counting up the count values of two tracks and a case of counting up the count value of one track.

A track adjacent to the first track of the media cache region M and located on the inner circumferential side of the first track is defined as an inner track. A track adjacent to the first track of the media cache region M and located on the outer circumferential side of the first track is defined as an outer track.

In the case in which the first track does not correspond to any of the innermost track and the outermost track of the media cache region M, the media cache region M includes both the inner track and the outer track, and the counter 64 can count up the count value of the inner track and the count value of the outer track in the case in which the write data is written to the first track.

In the case in which the first track corresponds to the innermost track of the media cache region M, the media cache region M includes the outer track, the inner track is the guard track, and the counter 64 can count up the count value of the outer track when the write data is written to the first track.

Similarly, in the case in which the first track corresponds to the outermost track of the media cache region M, the media cache region M includes the inner track, the outer track is the guard track, and the counter 64 can count up the count value of the inner track in the case in which the write data is written to the first track.

Next, the capacities of the nonvolatile memory 80 and the buffer memory 90 will be described.

The nonvolatile memory 80 has a recording capacity of, for example, 4 MiB as a recording capacity of several MiB. On the other hand, the buffer memory 90 has a recording capacity of, for example, 256 MiB as a recording capacity of several hundred MiB. The recording capacity of the nonvolatile memory 80 is smaller than the recording capacity of the buffer memory 90. Therefore, it is difficult to save all the write data of the buffer memory 90 to the nonvolatile memory 80.

At an arbitrary timing after the write data is written in the buffer memory 90, the write data included in the protection target by the management unit 62 is within a range where the write data is savable in the nonvolatile memory 80. Therefore, the management unit 62 can include, in the protection target, only the volume of data that can be saved in the nonvolatile memory 80.

Next, a processing procedure of the data protection processing unit 63 when the main power supply 5 is recovered and an effect by the processing procedure will be described.

When the main power supply 5 is recovered after the main power supply 5 is lost, the data protection processing unit 63 can perform processing as follows. That is, the data protection processing unit 63 can write the write data saved in the nonvolatile memory 80 and the write data written in the media cache region M in the buffer memory 90 and restore the write data in the buffer memory 90. As a result, the magnetic disk device 1 can continue the processing using the write data restored in the buffer memory 90.

FIG. 2 is a perspective view showing a part of the magnetic disk device 1, and is a view showing multiple disks DK and multiple heads HD. In FIG. 2, the media cache region M is not shown.

As shown in FIG. 2, a direction in which the disk DK rotates in the circumferential direction of the disk DK is referred to as a rotation direction d3. Note that in the example shown in FIG. 2, although the rotation direction is indicated in the counterclockwise direction, the rotation direction may be the opposite direction (clockwise direction). A traveling direction d2 of the head HD to the disk DK is opposite to the rotation direction d3. The traveling direction d2 is a direction in which the head HD sequentially writes and reads data to the disk DK in the circumferential direction, i.e., a direction in which the head HD travels with respect to the disk DK in the circumferential direction.

The magnetic disk device 1 includes i disks of disks DK1 to DKi, and j heads of heads HD1 to HDj. In the present embodiment, the number of heads HD is twice the number of disks DK (j=2×i).

The disks DK1 to DKi are coaxially provided and overlapped at intervals. The diameters of the disks DK1 to DKi are the same. The terms such as "the same", "identical", "match", and "equivalent" include the meaning of exactly the same as well as the meaning of being different to the extent that can be regarded as being substantially the same. Note that the diameters of the disks DK1 to DKi may be different from each other.

Each disk DK has recording layers L on both sides. For example, the disk DK1 includes a first recording layer La1 and a second recording layer Lb1 on the opposite side of the first recording layer La1. The disk DK2 includes a first recording layer La2 and a second recording layer Lb2 opposite to the first recording layer La2. The disk DKi includes a first recording layer Lai and a second recording layer Lbi opposite to the first recording layer Lai. Each of the first recording layers La is sometimes referred to as a front surface or a recording surface. Each of the second recording layers Lb is sometimes referred to as a back surface or a recording surface.

Each recording layer L has a user data region U, a system region S, and the like. The first recording layer La1 has a user data region Ua1 and a system region Sa1. The second recording layer Lb1 has a user data region Ub1 and a system region Sb1. The first recording layer La2 has a user data region Ua2 and a system region Sa2. The second recording layer Lb2 has a user data region Ub2 and a system region Sb2. The first recording layer Lai includes a user data region Uai and a system region Sai. The second recording layer Lbi includes a user data region Ubi and a system region Sbi.

In the user data region Ua1 (first recording layer La1), a track sandwiched by double dashed lines in the drawing is defined as a track Ta1. In the user data region Ub1 (second recording layer Lb1), a track located on the opposite side of the track Ta1 is defined as a track Tb1.

In the user data region Ua2 (first recording layer La2), a track sandwiched by double dashed lines in the drawing is defined as a track Tc1. In the user data region Ub2 (second recording layer Lb2), a track located on the opposite side of the track Tc1 is defined as a track Td1.

In the user data region Uai (first recording layer Lai), a track sandwiched by double dashed lines in the drawing is defined as a track Te1. In the user data region Ubi (second recording layer Lbi), a track located on the opposite side of the track Te1 is defined as a track Tf1.

In the present embodiment, the tracks Ta1, Tb1, Tc1, Td1, Te1, and Tf1 are located in the same cylinder.

The head HD faces the disk DK. In the present embodiment, one head HD faces each recording layer L of the disk DK. For example, the head HD1 faces the first recording layer La1 of the disk DK1, writes data in the first recording layer La1, and reads data from the first recording layer La1. The head HD2 faces the second recording layer Lb1 of the disk DK1, writes data in the second recording layer Lb1, and reads data from the second recording layer Lb1.

The head HD3 faces the first recording layer La2 of the disk DK2, writes data in the first recording layer La2, and reads data from the first recording layer La2. The head HD4 faces the second recording layer Lb2 of the disk DK2, writes data in the second recording layer Lb2, and reads data from the second recording layer Lb2. The head HDj-1 faces the first recording layer Lai of the disk DKi, writes data to the first recording layer Lai, and reads data from the first recording layer Lai. The head HDj faces the second recording layer Lbi of the disk DKi, writes data in the second recording layer Lbi, and reads data from the second recording layer Lbi.

FIG. 3 is a schematic diagram showing an example of arrangement of a plurality of servo regions SV and a plurality of data regions DTR of one disk DK according to the present embodiment. As shown in FIG. 3, in the radial direction d1 of the disk DK, a direction toward the outer circumference of the disk DK is referred to as an outward direction (outer side), and a direction opposite to the outward direction is referred to as an inward direction (inner side).

In FIG. 3, the user data region U is divided into an inner region IR located in the inward direction, an outer region OR located in the outward direction, and a middle region MR located between the inner region IR and the outer region OR.

The disk DK has a plurality of servo regions SV and a plurality of data regions DTR. For example, the servo regions SV may extend radially in the radial direction of the disk DK and be discretely arranged at predetermined intervals in the circumferential direction. For example, the servo regions SV may extend linearly from the inner circumference to the outer circumference and be discretely arranged at predetermined intervals in the circumferential direction. For example, the servo regions SV may extend spirally from the inner circumference to the outer circumference, and may be discretely arranged at predetermined intervals in the circumferential direction. Furthermore, for example, the servo regions SV may be arranged in an island shape in the radial direction and discretely arranged with predetermined intervals changed in the circumferential direction.

In the following, one servo region SV in a predetermined track is sometimes referred to as a "servo sector". Note that the "servo region SV" is sometimes referred to as a "servo sector SV". The servo sector includes servo data. In the following, the "arrangement or the like of some pieces of servo data constituting a servo sector" is sometimes referred to as a "servo pattern". Note that "servo data written in a servo sector" is sometimes referred to as "servo sector".

Each of the data regions DTR is arranged between the servo regions SV. For example, the data region DTR corresponds to a region between two continuous servo regions SV in the circumferential direction. In the following, one data region DTR in a predetermined track is sometimes referred to as a "data sector". Note that the "data region DTR" is sometimes referred to as a "data sector DTR". The data sector includes user data. Note that the "user data" written to the data sector is sometimes referred to as a "data sector". The "data sector" is sometimes referred to as "user data". A "pattern including some data" is sometimes referred to as a "data pattern". In the example shown in FIG. 3, the data pattern of the predetermined track includes a plurality of pieces of servo data (servo sectors) and a plurality of pieces of user data (data sectors).

The servo region SV includes a plurality of zone servo regions ZSV and the like. In addition to the zone servo region ZSV, the servo region SV may include a region including a gap (deviation of circumferential positions of two zone servo regions), a region including servo data, a data region DTR, and the like. The zone servo regions ZSV are discretely arranged along the radial direction d1. Each of the zone servo regions ZSV extends in the radial direction d1.

One zone servo region (servo region) ZSV in a predetermined track is sometimes referred to as a "zone servo sector" or a "servo sector". Note that the "zone servo region (servo region) ZSV" is sometimes referred to as a "zone servo sector ZSV" or a "servo sector ZSV". The "servo data written in the zone servo sector" is sometimes referred to as a "zone servo sector" or a "servo sector". In the following, the "arrangement or the like of some pieces of servo data constituting the zone servo sector" is sometimes referred to as a "zone servo pattern" or a "servo pattern". In the following, one servo region SV in a predetermined track is sometimes referred to as a "zone pattern sector".

Note that the "servo region SV" is sometimes referred to as a "zone pattern sector". "At least one piece of data or the like written in the zone pattern sector" is sometimes referred to as "zone pattern sector". The zone pattern sector includes at least one zone servo sector. In the following, the "data pattern of the zone pattern sector" is sometimes referred to as a "zone data pattern".

In the example shown in FIG. 3, the servo region SV has zone servo regions ZSV0, ZSV1, and ZSV2. The zone servo regions ZSV0, ZSV1, and ZSV2 are arranged in a staggered manner in the radial direction. The zone servo regions ZSV0, ZSV1, and ZSV2 may be arranged stepwise in the radial direction.

The zone servo region ZSV2 is located on the inner circumferential side of the zone servo region ZSV1. The zone servo region ZSV0 is located on the outer circumferential side of the zone servo region ZSV1. For example, the zone servo region ZSV2 is arranged from the inner region IR to the middle region MR, the zone servo region ZSV1 is arranged from the inner region IR to the outer region OR, and the zone servo region ZSV0 is arranged from the middle region MR to the outer region OR. In the following, in the predetermined servo region SV, a predetermined region in the radial direction in which the zone servo regions ZSV are arranged in the circumferential direction is sometimes referred to as a zone servo boundary region, a double servo region, or a double zone servo region ZB.

In the example shown in FIG. 3, a main servo region SVO and a sub-servo region SVE are alternately arranged at intervals in the circumferential direction. For example, one sub-servo region SVE is arranged between two main servo regions SVO arranged continuously at an interval in the circumferential direction. In other words, one sub-servo region SVE is arranged between two main servo regions SVO arranged continuously at an interval in the circumferential direction. For example, in the case in which consecutive numbers are sequentially assigned to all the servo regions SV of the disk DK, the main servo region SVO corresponds to an odd-numbered servo region SV, and the sub-servo region SVE corresponds to an even-numbered servo region SV. Note that two or more sub-servo regions SVE may be arranged between two main servo regions SVO arranged continuously at intervals in the circumferential direction.

The main servo region SVO and the sub-servo region SVE may include, for example, only a servo region (in the following, sometimes referred to as a normal servo region) that reads and demodulates servo data as a whole. In the following, "reading and demodulating servo data" is sometimes referred to as "servo reading". The main servo region SVO and the sub-servo region SVE may include, for example, a normal servo region and a servo region (in the following, sometimes referred to as a short servo region) that performs servo reading on a circumferential range of servo data smaller than a circumferential range of servo data that performs servo reading in the normal servo region.

In the description of the present embodiment, the case in which the number of zones of the disk DK is three is described as an example, but the number of zones of the disk DK can be variously modified. The number of zones of the disk DK may be 30 to 40. Each zone has a plurality of bands. For example, each zone has hundreds of bands.

Figure 4:
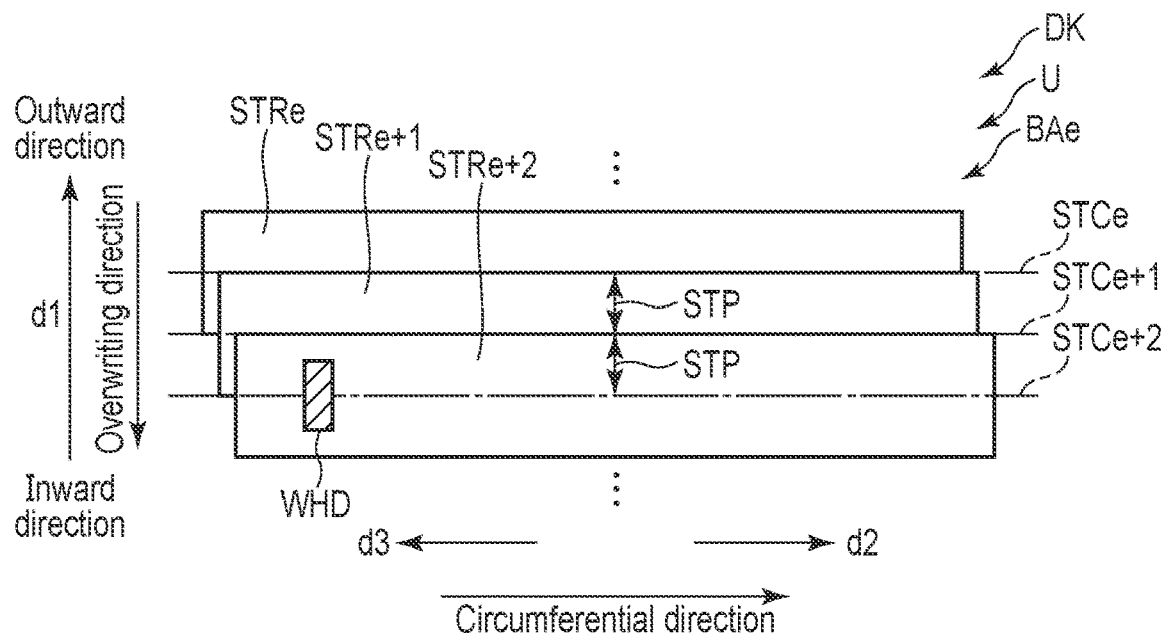
FIG. 4 is a schematic diagram showing three tracks in a user data region in which the shingled magnetic recording processing of the disk shown in FIG. 3 is performed and a write head.

FIG. 4 is a schematic diagram showing three tracks STR of the user data region U in which the shingled magnetic recording processing of the disk DK shown in FIG. 3 is performed and the write head WHD. The user data region U is a shingled magnetic recording region. In the user data region U, sequential writing of data in units of bands is permitted, i.e., shingled magnetic recording is permitted. The track STR is a data track.

As shown in FIG. 4, the write head WHD can sequentially write data to the disk DK in the traveling direction d2. The read head RHD shown in FIG. 3 can also sequentially read data written to the disk DK in the traveling direction d2.

In the direction parallel to the radial direction d1, a direction in which the tracks STR are continuously shingled and recorded, i.e., a direction in which the track STR to be written next is superimposed on the track STR written one time before in the radial direction d1 is referred to as an overwriting direction or a recording traveling direction. In a band BAe shown in FIG. 4, the overwriting direction is the inward direction, but the overwriting direction may be the outward direction.

For example, the overwriting direction applied to the bands BA (zones Z) located on the outer circumferential side to the specific radial position and the overwriting direction applied to the bands BA (zones Z) located on the inner circumferential side to the specific radial position may be opposite to each other.

The band BAe includes a plurality of tracks STR including tracks STRe, STRe+1, and STRe+2. The tracks STRe, STRe+1, and STRe+2 are continuously overwritten in the overwriting direction in the described order. Among the tracks STRe, STRe+1, and STRe+2, the track STRe corresponds to a track on which data is written first, and the track STRe+2 corresponds to a track on which data is written last.

The track STRe has a track center STCe at the center in the radial direction d1 in the case in which another track is not overwritten. The track STRe+1 has a track center STCe+1 at the center in the radial direction d1 in the case in which another track is not overwritten. The track STRe+2 has a track center STCe+2 at the center in the radial direction d1 in the case in which another track is not overwritten.

In the example shown in FIG. 4, the tracks STRe, STRe+1, and STRe+2 are written at a pitch (shingled magnetic recording track pitch) STP. The track center STCe of the track STRe and the track center STCe+1 of the track STRe+1 are separated by a pitch STP in the radial direction d1. The track center STCe+1 of the track STRe+1 and the track center STCe+2 of the track STRe+2 are separated by the pitch STP in the radial direction d1. The tracks STRe to STRe+2 may be written at different pitches.

The width in the radial direction d1 of the region of the track STRe where the track STRe+1 is not overwritten is the same as the width in the radial direction d1 of the region of the track STRe+1 where the track STRe+2 is not overwritten. Note that the width in the radial direction d1 of the region of the track STRe where the track STRe+1 is not overwritten may be different from the width in the radial direction d1 of the region of the track STRe+1 where the track STRe+2 is not overwritten.

In FIG. 4, for convenience of description, each track STR is shown in a rectangular shape, but in practice, each track STR is curved along the circumferential direction. Each track STR may have a wave shape extending in the circumferential direction while varying in the radial direction d1. Note that although three tracks STR are overwritten in FIG. 4, more than three tracks STR may be overwritten. A plurality of tracks STR may be overwritten in units of the bands BAe.

The write processing unit 61a can select shingled magnetic recording in which data is written to the tracks STR in an overlapping manner in the radial direction d1 of the disk DK and execute the write processing. In the example shown in FIG. 4, the write processing unit 61a sequentially records the tracks STRe to STRe+2 in the band BAe in a shingled manner at the pitch STP in the inward direction (overwriting direction).

The write processing unit 61a writes the track STRe+1 at the pitch STP in the inward direction of the track STRe and overwrites the track STRe+1 on a part of the inner circumferential side of the track STRe. The write processing unit 61a writes the track STRe+2 at the pitch STP in the inward direction of the track STRe+1, and overwrites the track STRe+2 on a part of the inner circumferential side of the track STRe+1.

Figure 5:
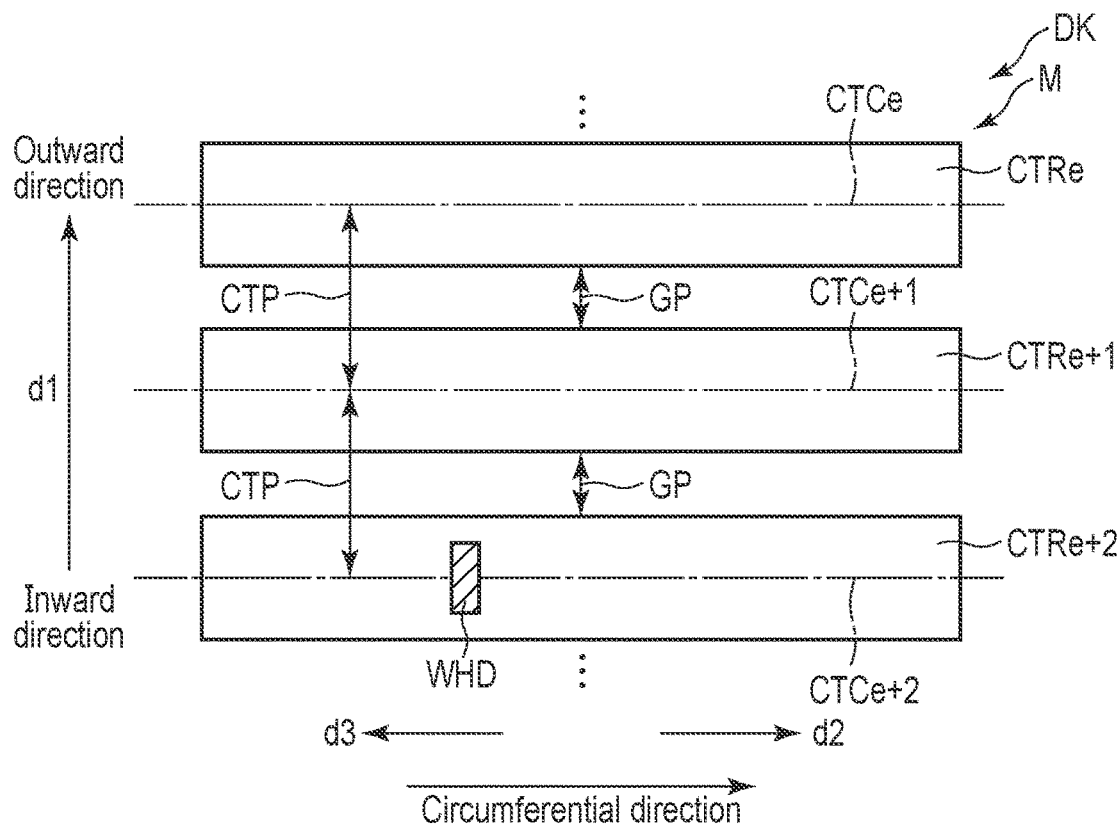
FIG. 5 is a schematic diagram showing three tracks in a media cache region in which the conventional magnetic recording processing of the disk shown in FIG. 3 is performed and a write head.

FIG. 5 is a schematic diagram showing three tracks CTR of the media cache region M in which the conventional magnetic recording processing of the disk DK shown in FIG. 3 is performed and the write head WHD. The media cache region M and the system region S shown in FIG. 3 are conventional magnetic recording regions. In the media cache region M and the system region S, the random writing of data is permitted, i.e., conventional magnetic recording is permitted. The track CTR is a data track.

As shown in FIG. 5, the media cache region M has a plurality of tracks CTR including tracks CTRe, CTRe+1, and CTRe+2. For example, widths (track widths) of the tracks CTRe, CTRe+1, and CTRe+2 in the radial direction d1 are the same. Note that the track widths of the tracks CTRe to CTRe+2 may be different from each other.

The track CTRe has a track center CTCe at the center in the radial direction d1, the track CTRe+1 has a track center CTCe+1 at the center in the radial direction d1, and the track CTRe+2 has a track center CTCe+2 at the center in the radial direction d1. In the example shown in FIG. 5, the tracks CTRe, CTRe+1, and CTRe+2 are written at a pitch (conventional magnetic recording track pitch) CTP. The track center CTCe of the track CTRe and the track center CTCe+1 of the track CTRe+1 are separated by the pitch CTP. The track center CTCe+1 of the track CTRe+1 and the track center CTCe+2 of the track CTRe+2 are separated by the pitch CTP.

The track CTRe and the track CTRe+1 are separated from each other with a gap GP. The track CTRe+1 and the track CTRe+2 are separated from each other with the gap GP. Note that the tracks CTRe to CTRe+2 may be written at different pitches. In FIG. 5, for convenience of description, each track CTR is shown in a rectangular shape, but in practice, each track CTR is curved along the circumferential direction. Each track CTR may have a wave shape extending in the circumferential direction while varying in the radial direction d1.

The write processing unit 61a can execute the write processing by selecting conventional magnetic recording in which data is written to a plurality of tracks CTR at intervals in the radial direction d1 of the disk DK. In the example shown in FIG. 4, the write processing unit 61a positions the write head WHD at the track center CTCe in a predetermined region of the disk DK and performs conventional magnetic recording on the track CTRe or a predetermined sector of the track CTRe.

The write processing unit 61a positions the write head WHD at the track center CTCe+1 separated in the inward direction from the track center CTCe of the track CTRe by the pitch CTP, and performs conventional magnetic recording on the track CTRe+1 or the predetermined sector of the track CTRe+1. The write processing unit 61a positions the write head WHD at the track center CTCe+2 spaced apart in the inward direction from the track center CTCe+1 of the track CTRe+1 at the pitch CTP, and performs conventional magnetic recording on the track CTRe+2 or the predetermined sector of the track CTRe+2.

The write processing unit 61a may perform conventional magnetic recording on the tracks CTRe, CTRe+1, and CTRe+2 sequentially in a predetermined region of the disk DK, or may perform conventional magnetic recording randomly on a predetermined sector of the track CTRe, a predetermined sector of the track CTRe+1, and a predetermined sector of the track CTRe+2.

Figure 6:
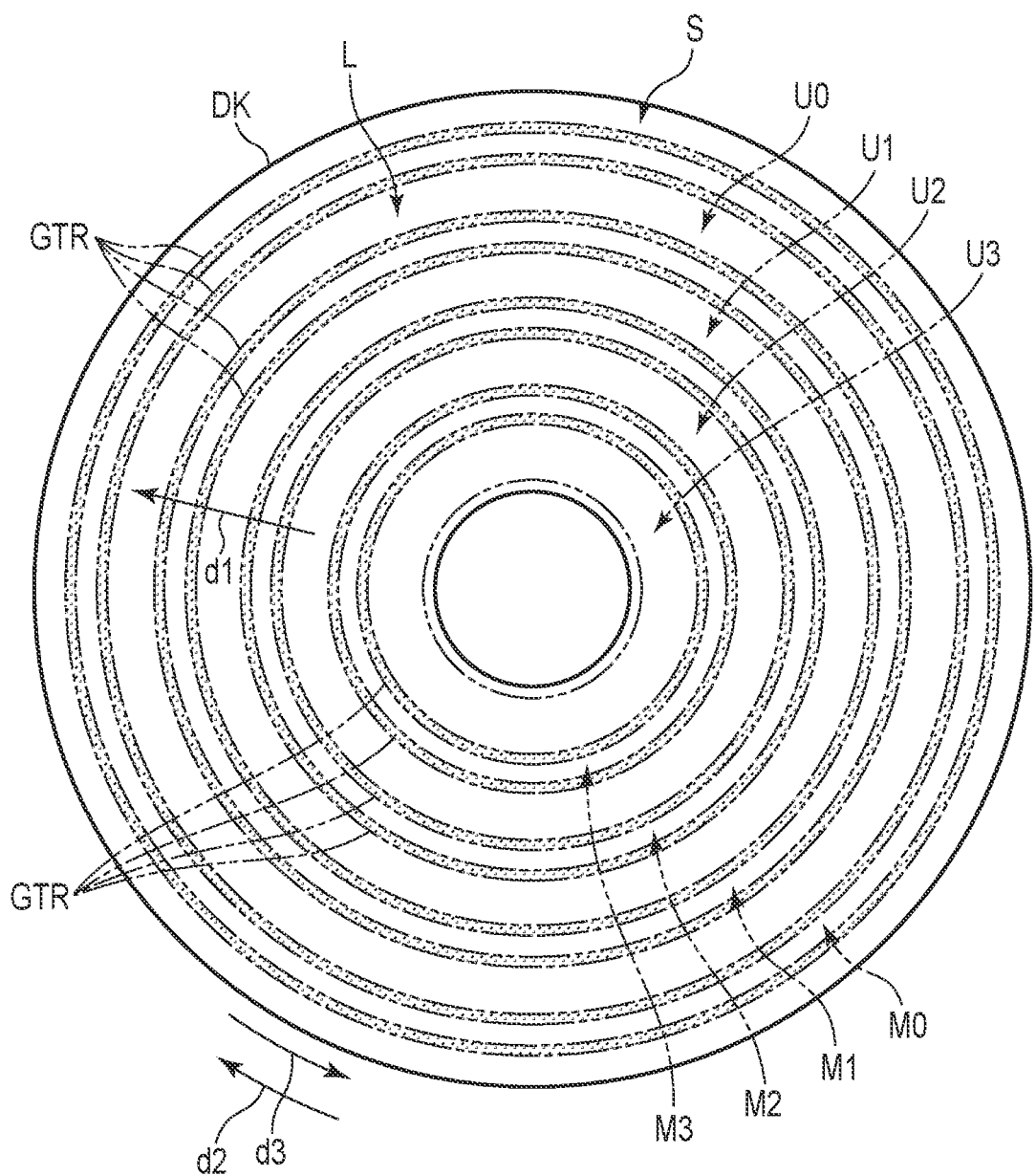

FIG. 6 is an enlarged plan view showing the disk DK shown in FIG. 3, and is a diagram showing four media cache regions M, four user data regions U, and the like.

As shown in FIG. 6, the disk DK includes media cache regions M0, M1, M2, and M3 and user data regions U0, U1, U2, and U3 in the recording layer L. The media cache regions M0, M1, M2, and M3 are provided in this order in the inward direction. In order to volatilize the operation of receiving the write data in the nonvolatile memory 80 by the PLP, the media cache regions M0 to M3 are temporary saving places of the write data of the buffer memory 90. The user data regions U0, U1, U2, and U3 are provided in this order in the inward direction. The media cache region M and the user data region U are alternately provided in the radial direction d1.

One guard track GTR is provided between the media cache region M and the user data region U adjacent in the radial direction d1. However, two or more guard tracks GTR may be provided between the media cache region M and the user data region U. In the present embodiment, the system region S is provided on the outermost circumferential side of the recording layer L. The system region S and the media cache region M0 are adjacent to each other in the radial direction d1, and one or a plurality of guard tracks GTR are also provided between the system region S and the media cache region M0. In the drawing, a dot pattern is depicted to the guard track GTR.

Note that the number of each of the media cache region M and the user data region U provided in the recording layer L and the layout of the media cache region M and the user data region U are not limited to the example of FIG. 6, and can be variously modified. The disk DK only needs to have at least one media cache region M and at least one user data region U in the recording layer L.

Figure 7:
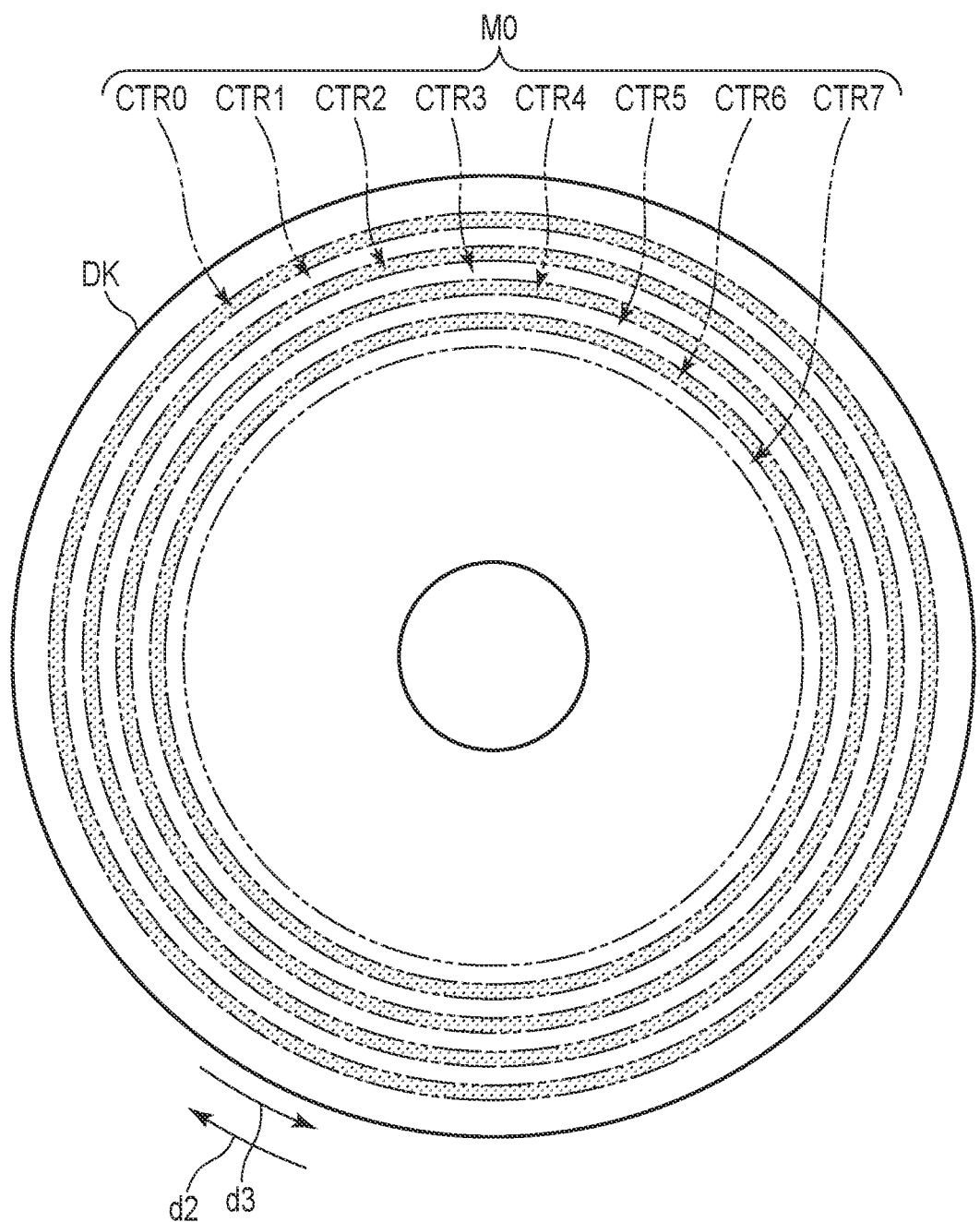
FIG. 7 is a plan view showing the disk shown in FIG. 6, and is an enlarged view showing a plurality of tracks in a media cache region.

FIG. 7 is a plan view showing the disk DK shown in FIG. 6, and is an enlarged view showing a plurality of tracks CTR in one media cache region M0.

As shown in FIG. 7, the media cache region M0 includes eight tracks CTR0, CTR1, CTR2, . . . , and CTR7. The tracks CTR0, CTR1, CTR2, . . . , and CTR7 are provided in this order in the inward direction and are continuous in the radial direction d1. In the drawing, the tracks CTR0, CTR2, CTR4, and CTR6 are denoted by dot patterns, and the tracks CTR1, CTR3, CTR5, and CTR7 are not denoted by patterns. Each track CTR has a plurality of sectors.

Note that the number of tracks CTR included in the media cache region M is not limited to eight, and can be variously modified.

Next, the case in which the write processing unit 61a writes the write data in the media cache region M without reordering by the write data selection processing unit 66 and the case in which the write processing unit 61a writes the write data in the media cache region M using the reordering by the write data selection processing unit 66 will be described.

Figure 8:
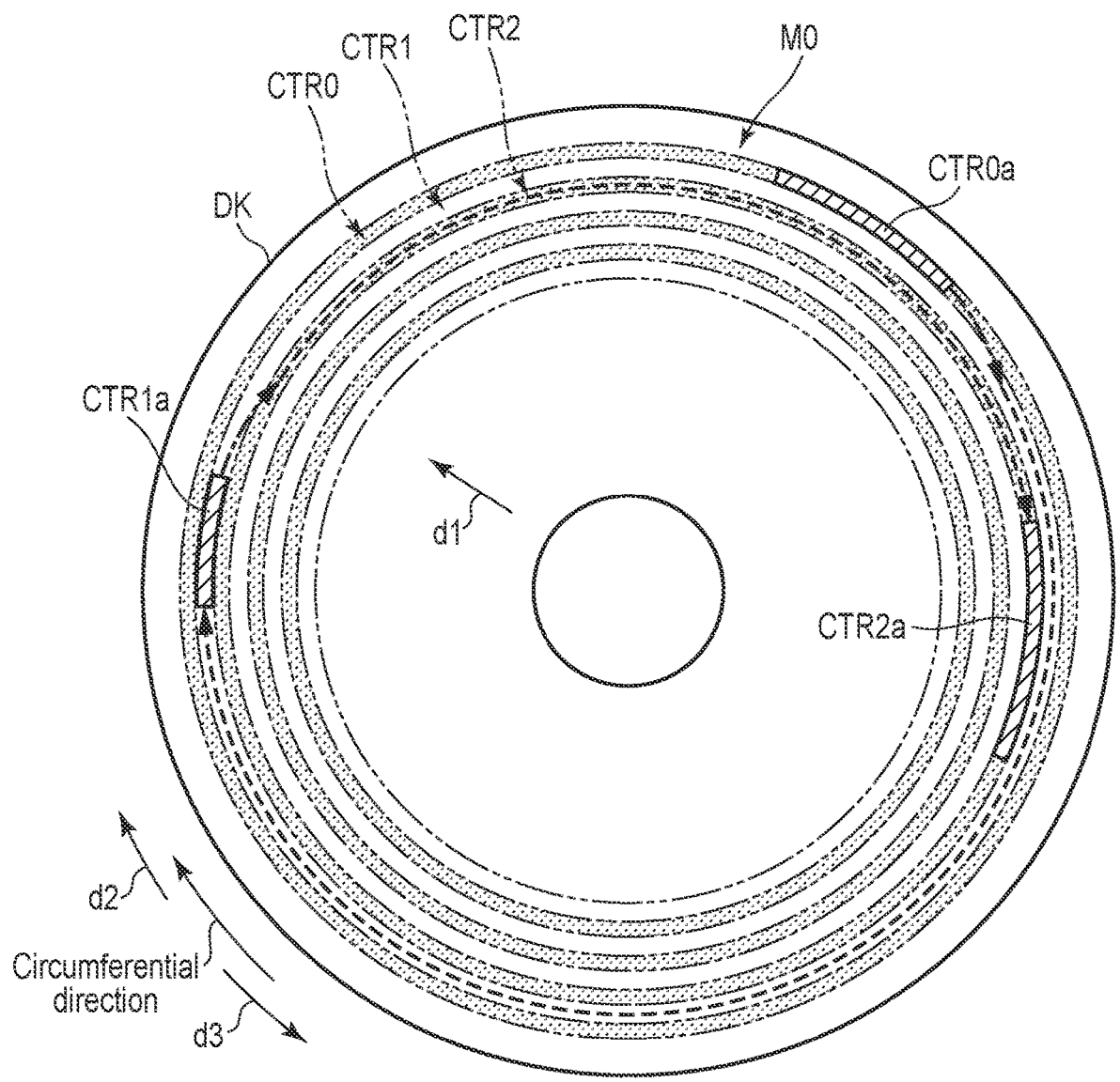
FIG. 8 is a plan view showing the disk shown in FIG. 7, and is a diagram that describes an example in which write data 1, write data 2, and write data 3 are sequentially written without reordering in the case in which the write data 1, the write data 2, and the write data 3 are sequentially received.
Figure 9:
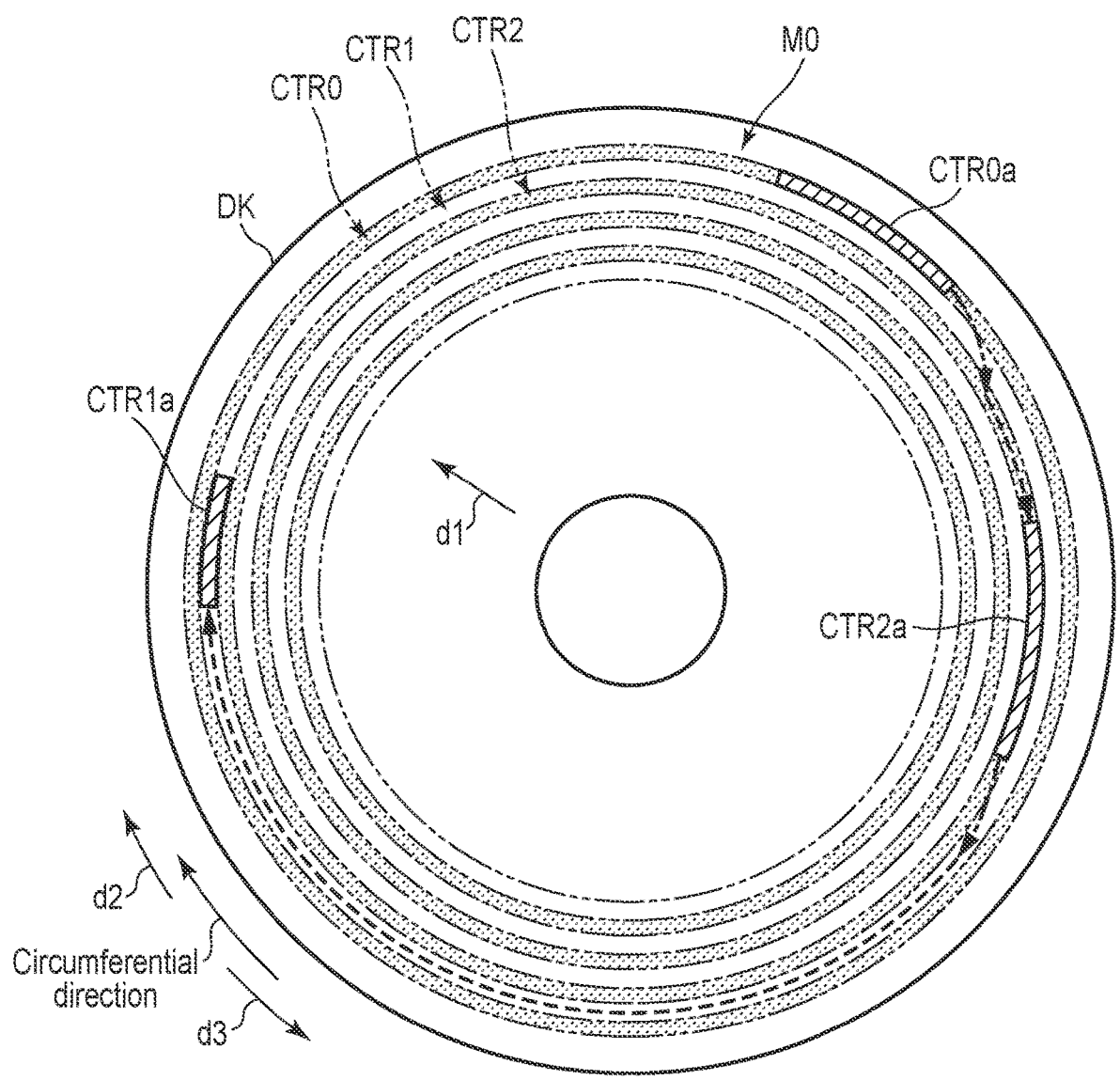
FIG. 9 is a plan view showing the disk shown in FIG. 7, and is a diagram that describes an example in which reordering is performed and the write data 1, the write data 3, and the write data 2 are sequentially written in the case in which the write data 1, the write data 2, and the write data 3 are sequentially received.

FIG. 8 is a plan view showing the disk DK shown in FIG. 7, and is a diagram that describes an example in which write data 1, write data 2, and write data 3 are sequentially written without reordering in the case in which the write data 1, the write data 2, and the write data 3 are sequentially received. FIG. 9 is a plan view showing the disk DK shown in FIG. 7, and is a diagram that describes an example in which reordering is performed and the write data 1, the write data 3, and the write data 2 are sequentially written in the case in which the write data 1, the write data 2, and the write data 3 are sequentially received.

Note that, in FIGS. 8 and 9, an arrow of a one-dot chain line indicates a seek, which is an operation of moving from the current track to the target track. The dashed line arrow indicates a rotation waiting operation from the completion of the movement of the head to the target track until the target sector comes around.

As shown in FIG. 8, in the case in which the host 100 issues a plurality of pieces of write data and the magnetic disk device 1 receives write data including a plurality of write commands at a time, the magnetic disk device 1 processes the write data in order of arrival. For example, in the case in which the write data 1, the write data 2, and the write data 3 are sequentially received in order, the magnetic disk device 1 sequentially writes the write data 1, the write data 2, and the write data 3 without performing reordering.

First, the write processing unit 61a writes the write data 1 in the execution region CTR0a of the track CTR0. Subsequently, a seek and a rotation waiting operation are performed, and the write data 2 is written in an execution region CTR1a of the track CTR1. Subsequently, a seek and a rotation waiting operation are performed, and write data is written in an execution region CTR2a of the track CTR2. Note that each of the execution region CTR0a, the execution region CTR1a, and the execution region CTR2a includes one or more sectors. In the radial direction d1, the execution region CTR1a is located on the inner circumferential side of the execution region CTR0a, and the execution region CTR2a is located on the inner side of the execution region CTR1a.

In the example of FIG. 8, the distance from the current execution region to the next execution region becomes long. Specifically, in the traveling direction d2, the distance from the tail of the tail sector of the current execution region to the head of the head sector of the next execution region becomes long. Then, the rotation waiting time becomes long. In the example of FIG. 8, it is difficult to shorten the overhead.

As shown in FIG. 9, on the other hand, the write data selection processing unit 66 rearranges and processes the write data in a reasonable order. For example, in the case in which the magnetic disk device 1 sequentially receives the write data 1, the write data 2, and the write data 3, the write data selection processing unit 66 determines that the execution region CTR1a is accessible following the execution region CTR0a. The write data selection processing unit 66 performs reordering, and the write processing unit 61a sequentially writes the write data 1, the write data 3, and the write data 2.

First, the write data 1 is written for the execution region CTR0a of the track CTR0. Subsequently, a seek and a rotation waiting operation are performed, and the write data 3 is written in the execution region CTR2a of the track CTR2. Subsequently, a seek and a rotation waiting operation are performed, and the write data 2 is written in the execution region CTR1a of the track CTR1.

In the example of FIG. 9, the distance from the current execution region to the subsequent execution region can be minimized. That is, the rotation waiting time can be shortened. Then, the write processing of the write data 1, the write data 2, and the write data 3 to the media cache region M can be completed at the highest speed. Therefore, in the example of FIG. 9, the overhead can be shortened.

Next, the management table TL will be described. FIG. 10 is a diagram showing a part of the management table TL shown in FIG. 1, and is a diagram showing a plurality of count values and the like of the media cache regions M0 to M3 of the first recording layer La1. The head HD1 faces the first recording layer La1.

As shown in FIG. 10, among the use states of the track CTR, "free" means that the track CTR is the free track, and "data present" means that the track CTR is the valid track. The difference calculated in units of the media cache region M can be recorded in the management table TL. The determination unit 65 can determine whether the difference has reached the threshold for each media cache region M. The determination unit 65 does not determine whether the difference between the count values of the ATI has reached the threshold between the adjacent tracks CTR. This determination by the determination unit 65 is desirable because overhead is not caused.

When attention is paid to the media cache region M0 of the first recording layer La1 (head HD1), there is a difference reaching the threshold. In the track CTR4, the difference has reached the threshold. Therefore, the data protection processing unit 63 can determine that it is necessary to perform the PLP processing on the original data of the write data of the track CTR4.

On the other hand, when attention is paid to the media cache regions M1 to M3 of the first recording layer La1, there is no difference reaching the threshold. Therefore, the data protection processing unit 63 can determine that it is not necessary to perform the PLP processing on the original data of the write data in the media cache regions M1 to M3.

In the present embodiment, the threshold is common to all the media cache regions M of all the recording layers L (heads HD) (for example, "10"). However, the threshold may be made different for each recording layer L, or the threshold may be made different for each media cache region M.

Next, an example of an undesirable processing of the MPU 60 in the case in which the determination unit 65 does not determine whether the difference has reached the threshold will be described. FIG. 11 is a diagram showing a plurality of count values and the like of one media cache region M0 in the management table TL shown in FIG. 10, and is a diagram reflecting a result of writing the write data continuously to a fourth track without determining whether the difference has reached the threshold.

As shown in FIG. 11, the track CTR3 is the fourth track. The write data is continuously and excessively written in the track CTR3. The count value of each of the tracks CTR2 and CTR4 adjacent to the track CTR3 exceeds "10". Since the adverse effect of ATI on the tracks CTR2 and CTR4 increases, an error is likely to occur when the write data of the tracks CTR2 and CTR4 is read. For example, the write data of the tracks CTR2 and CTR4 is damaged. In this case, it is difficult for the media cache region M0 to guarantee the write data.

Next, a desirable processing example of the MPU 60 will be described with reference to FIGS. 12 to 16. FIG. 12 is a diagram showing a plurality of count values and the like of one media cache region M0 in the management table TL shown in FIG. 10, and is a diagram reflecting a result of writing the write data to the fourth track (track CTR3). FIG. 13 is a diagram showing a state after a lapse of time from the state of the management table TL shown in FIG. 12, and is a diagram reflecting up to the result of writing the write data to the fourth track (track CTR3). FIG. 14 is a diagram reflecting that the fifth track is regarded as a free track after time has elapsed from the state of the management table TL shown in FIG. 13 and the original data of the write data of the fifth track (track CTR4) is returned to the protection target.

FIG. 15 is a diagram reflecting that time has elapsed from the state of the management table TL shown in FIG. 14 and a seventh track is regarded as a free track after the original data of the write data of the seventh track (track CTR6) is written in the user data region U. FIG. 16 is a diagram showing an example different from that in FIG. 15, and is a diagram reflecting that the merged write data generated using the original data of the write data of the seventh track (track CTR6) is written to a third track (track CTR2) by garbage collection after a lapse of time from the state of the management table TL shown in FIG. 14, and then the seventh track is regarded as a free track.

As shown in FIG. 12, in the case in which all the tracks CTR0 to CTR7 in the media cache region M0 of the first recording layer La1 are in a state of free tracks, write data is then written to the track CTR4, and subsequently write data is written to the track CTR5. When the write data is written to the track CTR5, the counter 64 counts up the count value of the track CTR4, which is a valid track. As a result, the count value of the track CTR4 becomes "1", and the difference between the count value of the track CTR4 and the count value (minimum value) of another track CTR becomes "1".

As shown in FIG. 13, after that, the write data is written to the media cache region M0 of the first recording layer La1 a plurality of times, and the write data is finally written to the track CTR3. When the write data is written to the track CTR3, the counter 64 counts up the count value of the track CTR4, which is a valid track. As a result, the count value of the track CTR4 becomes "10", and the difference between the count value of the track CTR4 and the count value (minimum value) of another track CTR becomes "10". As a result, the determination unit 65 can determine that the difference has reached the threshold.

As shown in FIG. 14, the data protection processing unit 63 performs the PLP processing on the write data of the buffer memory 90, which is the original data of the write data of the track CTR4, together with the management unit 62. As a result, the write processing unit 61a can regard the track CTR4, which is a valid track, as a free track that is overwritable, and the counter 64 can reset the count value of the track CTR4 to the initial value. Then, the track CTR4, which is a free track, can be newly added to the writable region selectable at the time of reordering, the writable region is hardly depleted, and the write processing can be performed by freely selecting the writable region.

As shown in FIG. 15, after that, the write processing unit 61a writes the write data of the buffer memory 90, which is the original data of the write data of the track CTR6, in the user data region U. Therefore, the write processing unit 61a can regard the track CTR6, which is a valid track, as a free track that is overwritable, and the counter 64 can reset the count value of the track CTR6 to the initial value. Then, the track CTR6, which is a free track, can be newly added to the writable region.

As shown in FIG. 16 or by garbage collection, the write data merge processing unit 67 may generate merged write data in which the write data of the buffer memory 90, which is original data of the write data of the track CTR6, and the head write data selected next by the write data selection processing unit 66 are merged, and the write processing unit 61a may write the merged write data to the track CTR2.

Therefore, the write processing unit 61a can regard the track CTR6, which is a valid track, as a free track that is overwritable, and the counter 64 can reset the count value of the track CTR6 to the initial value.

On the other hand, when the merged write data is written to the track CTR2, the counter 64 counts up the count value of the track CTR3, which is the valid track. As a result, the count value of the track CTR3 becomes "1".

In accordance with the magnetic disk device 1 according to the present embodiment thus configured, the magnetic disk device 1 includes the disk DK, the head HD, the buffer memory 90, the nonvolatile memory 80, the main power supply 5, and the MPU 60. The MPU 60 includes the write processing unit 61a, the management unit 62, the data protection processing unit 63, the counter 64, and the determination unit 65. When the determination unit 65 determines that the difference between the maximum value and the minimum value among the plurality of count values of the tracks CTR of the media cache region M has reached the threshold, the management unit 62 can perform processing as follows. That is, the management unit 62 can return the write data of the buffer memory 90, which is the original data of the write data of the track CTR in which the count value becomes the maximum value among the tracks CTR, to the protection target.

Since the PLP processing can be performed on the original data, the write data (original data) of the buffer memory 90 can be promptly guaranteed. Then, the write data of the track CTR can be guaranteed without additional write processing to the media cache region M. As described above, it is possible to obtain the magnetic disk device 1 capable of shortening the time necessary for the write processing to the media cache region M. In accordance with the magnetic disk device 1 according to the present embodiment, since the system that guarantees the write data in the media cache region M is provided, it is possible to safely perform the write processing to the media cache region M.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk having a media cache region including a plurality of tracks continuous in a radial direction in a recording layer;
   a head that writes data to the recording layer of the disk and reads data from the recording layer;
   a volatile buffer memory in which write data including a write command and user data corresponding to the write command is written;
   a nonvolatile memory;
   a main power supply; and
   a control unit,
   the control unit including
   a write processing unit that controls write processing of data to the recording layer,
   a management unit that includes, among the write data written in the volatile buffer memory, write data before being written in the media cache region as a protection target and removes the write data after being written in the media cache region from the protection target,
   a data protection processing unit that saves the write data managed as the protection target by the management unit to the nonvolatile memory when the main power supply is lost,
   a counter capable of individually counting up a count value of each of the tracks in the media cache region, the counter being capable of counting up the count value of a track adjacent to a track on which write data has been written each time the write data is written to the media cache region, and
   a determination unit that determines whether a difference between a maximum value and a minimum value among a plurality of count values of the tracks of the media cache region reaches a threshold,
   the management unit, when the determination unit determines that the difference has reached the threshold, returning the write data of the volatile buffer memory, which is original data of the write data of the track in which the count value becomes the maximum value among the tracks, to the protection target.

2. The magnetic disk device according to claim 1, wherein when the determination unit determines that the difference has reached the threshold,
   the counter resets the count value of the track in which the count value becomes the maximum value to an initial value, and
   the write processing unit regards the track in which the count value becomes the maximum value as a free track that is overwritable.

3. The magnetic disk device according to claim 1, wherein the control unit further includes a write data selection processing unit that performs reordering processing of rearranging the write data written in the volatile buffer memory, and
   the write processing unit writes the write data selected by the write data selection processing unit in the media cache region.

4. The magnetic disk device according to claim 3, wherein every time when the management unit updates the protection target,
   the write data selection processing unit performs the reordering processing.

5. The magnetic disk device according to claim 3, wherein the control unit further includes a write data merge processing unit,
   when the determination unit determines that the difference has reached the threshold,
   the write data merge processing unit generates merged write data in which head write data selected next by the write data selection processing unit and the write data that is the original data are merged, and
   the write processing unit writes the merged write data including the head write data selected by the write data selection processing unit in the media cache region.

6. The magnetic disk device according to claim 1, wherein the control unit further includes
   a command response processing unit that reports status indicating that execution of the write command of the write data as the protection target is completed when the management unit includes the write data in the protection target.

7. The magnetic disk device according to claim 1, wherein
the disk further includes a user data region in the recording layer,
the control unit further includes
a command selection processing unit that performs reordering processing of rearranging a plurality of write commands of the write data written in the volatile buffer memory, and
a command execution unit that executes the write command selected by the command selection processing unit,
write data written in the volatile buffer memory includes first write data including a first write command and first user data corresponding to the first write command,
after the first write data read from the volatile buffer memory is written to the media cache region,
the command execution unit executes the first write command selected by the command selection processing unit,
the write processing unit
writes the first user data read from the volatile buffer memory in the user data region, and
subsequently regards a region of the media cache region in which the first write data remains as a free space that is overwritable, and
the management unit regards a region of the volatile buffer memory in which the first write data remains as a free space that is overwritable.

8. The magnetic disk device according to claim 7, wherein
when the write processing unit regards the entire region of the track in which the first write data remains in the media cache region as the free space,
the counter resets the count value of the track in which the first write data remains to an initial value.

9. The magnetic disk device according to claim 1, wherein
each of the tracks in the media cache region is a free track on which the write data is not written, the free track on which the write data is written and overwriting is permitted, or a valid track on which the write data is written and overwriting is prohibited, and
the counter includes the valid track as a target for counting up the count value and the counter removes the free track from a target for counting up the count value.

10. The magnetic disk device according to claim 1, wherein
at an arbitrary timing after the write data is written in the volatile buffer memory, write data included in the protection target by the management unit is within a range where the write data is savable in the nonvolatile memory.

11. The magnetic disk device according to claim 1, wherein
in the media cache region, assuming that a track adjacent to a first track and located on an inner circumferential side of the first track in the tracks is an inner track and a track adjacent to the first track and located on an outer circumferential side of the first track is an outer track,
the counter counts up the count value of the inner track and the count value of the outer track when the write data is written to the first track.

12. The magnetic disk device according to claim 1, wherein
the nonvolatile memory includes a management table that individually stores the count value of each of the tracks in the media cache region.

13. The magnetic disk device according to claim 1, wherein
when the main power supply is restored after the main power supply is lost,
the data protection processing unit writes the write data saved in the nonvolatile memory and the write data written in the media cache region in the volatile buffer memory, and restores the write data in the volatile buffer memory.

14. The magnetic disk device according to claim 1, wherein
the nonvolatile memory is a flash read only memory.

\* \* \* \* \*